(12) United States Patent
Matsui et al.

(10) Patent No.: US 7,266,669 B2
(45) Date of Patent: Sep. 4, 2007

(54) FILE SYSTEM WITH FILE MANAGEMENT FUNCTION AND FILE MANAGEMENT METHOD

(75) Inventors: Koji Matsui, Fuchu (JP); Hitoshi Tanigawa, Higashiyamato (JP); Yuji Kondo, Hamura (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 304 days.

(21) Appl. No.: 11/144,637

(22) Filed: Jun. 6, 2005

(65) Prior Publication Data

US 2006/0069885 A1 Mar. 30, 2006

(30) Foreign Application Priority Data

Sep. 30, 2004 (JP) ............................. 2004-289029

(51) Int. Cl.
*G06F 12/10* (2006.01)
*G06F 12/16* (2006.01)

(52) U.S. Cl. ...................... 711/202; 711/221; 707/201; 707/204

(58) Field of Classification Search ................ 711/202, 711/206, 221; 707/200, 201, 204
See application file for complete search history.

(56) References Cited

U.S. PATENT DOCUMENTS 5,455,946 A * 10/1995 Mohan et al. .............. 707/202
5,721,915 A * 2/1998 Sockut et al. ............... 707/200
6,651,073 B1 * 11/2003 Lyle et al. ................... 707/202
7,177,866 B2 * 2/2007 Holenstein et al. ............ 707/8
2005/0120059 A1 * 6/2005 Verma et al. ................ 707/200

OTHER PUBLICATIONS

Gray, et al., "Transaction Processing: Concepts and Techniques", Nikkei Business Publications, Inc., vol. 2, pp. 860-870, (2001).
Hattori, et al., "Native XML Database for Contents Management Offering High Performance and Reliability", Toshiba Review, vol. 59, No. 2, pp. 54-57, (2004).

* cited by examiner

*Primary Examiner*—Jack Lane
(74) *Attorney, Agent, or Firm*—Finnegan, Henderson, Farabow, Garrett & Dunner, L.L.P.

(57) ABSTRACT

The storage area of a storage unit includes a file area and temporary write area. A pair of map tables are allocated in the storage area. An update processing unit executes update of a page in a file stored in a file area by writing updated data to an unused page acquired from a temporary write area. A commit module alternately writes a list of effective pages in the temporary write area to the pair of map tables whenever each of transactions is committed. A checkpoint processing unit writes back the updated data of each effective page in the temporary write area to the corresponding original page position in the file area.

17 Claims, 12 Drawing Sheets

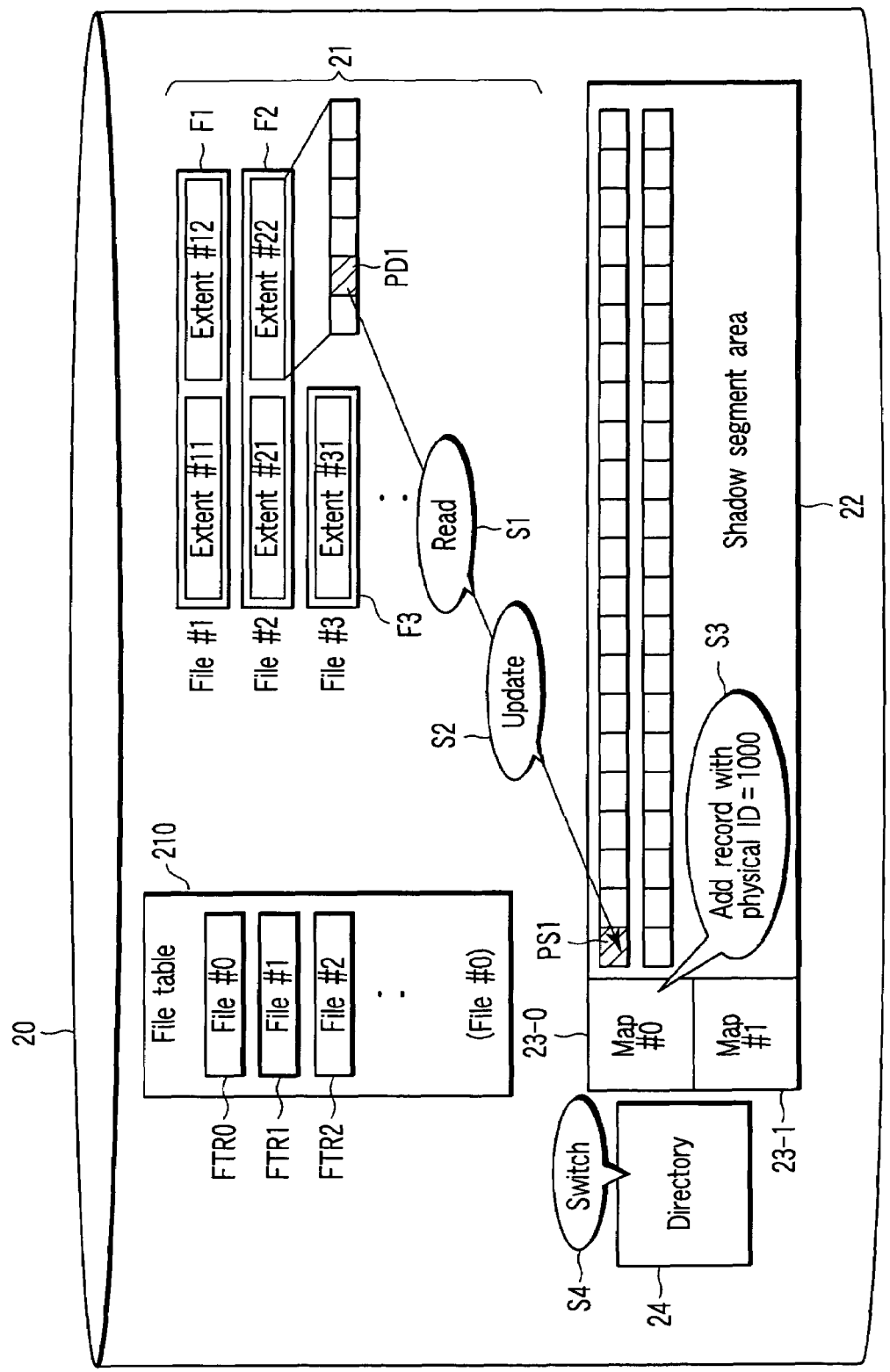
F I G. 5

| Extent structure of file #2 ||||
|---|---|---|---|
| Extent | Start physical ID | Number of accumulated pages | Used-page position |
| Extent #21 | 1 | 5 | 5 |
| Extent #22 | 211 | 15 | 15 |
| Extent #23 | 471 | 25 | 24 |

FTR2

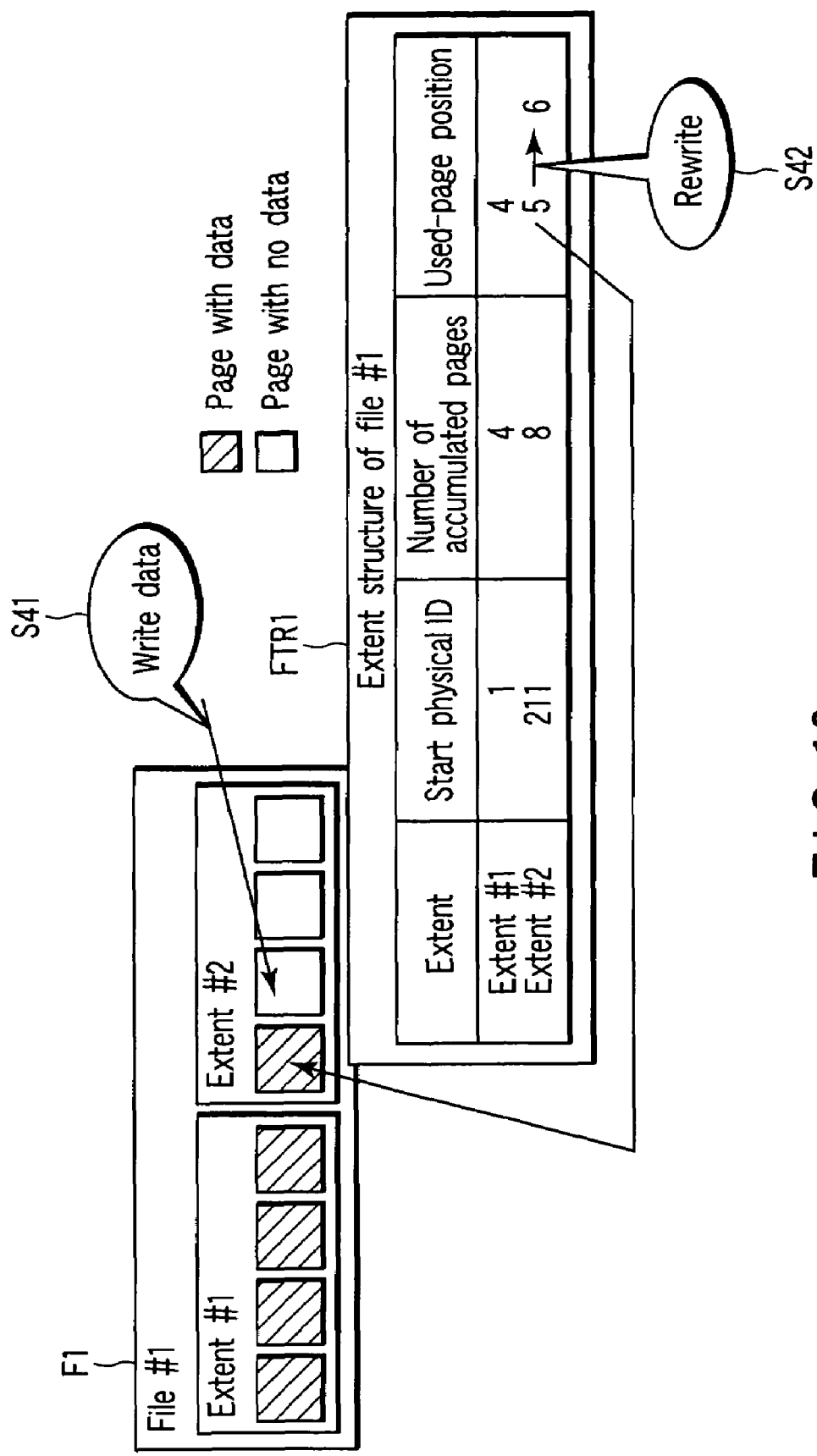
F I G. 10

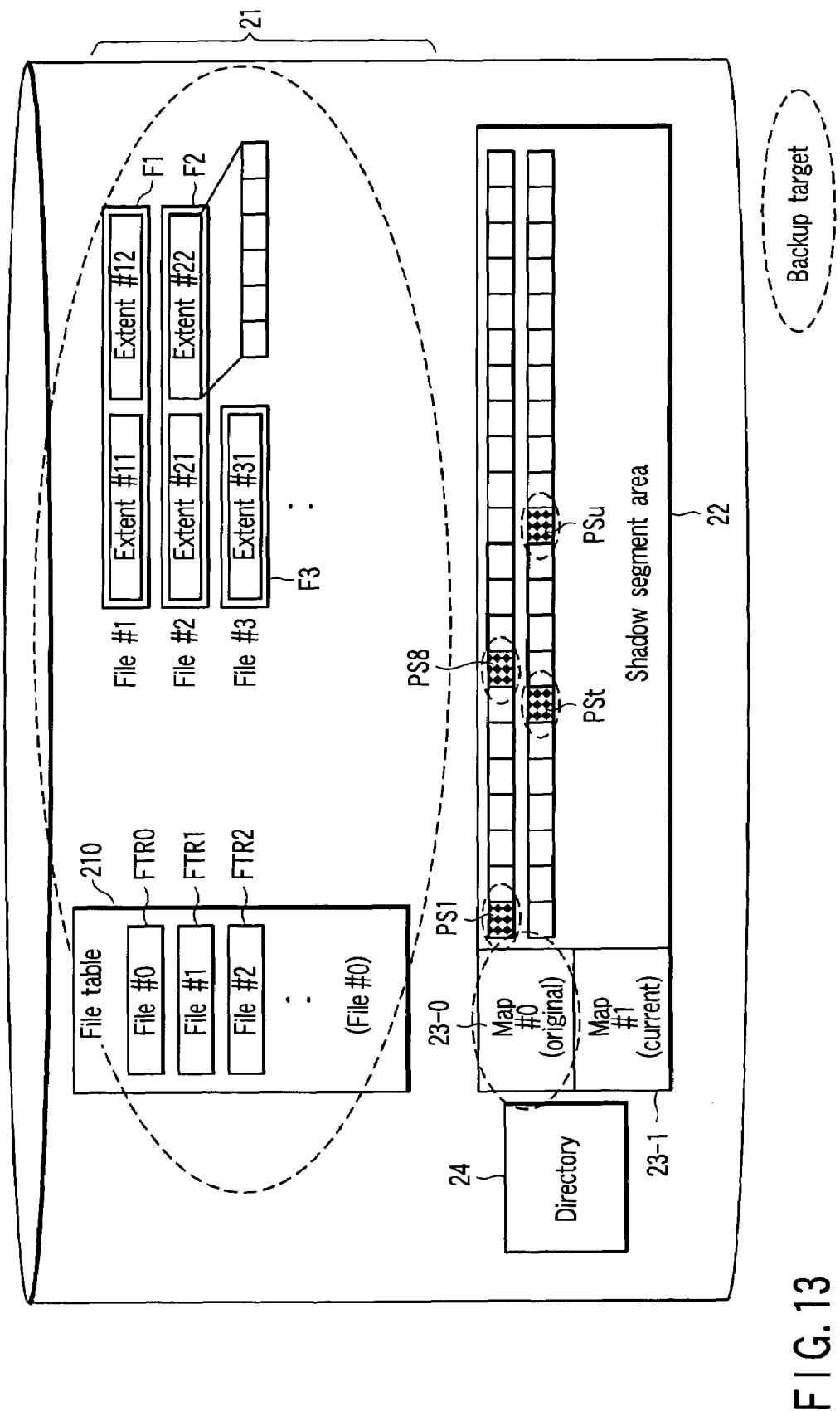
F I G. 13

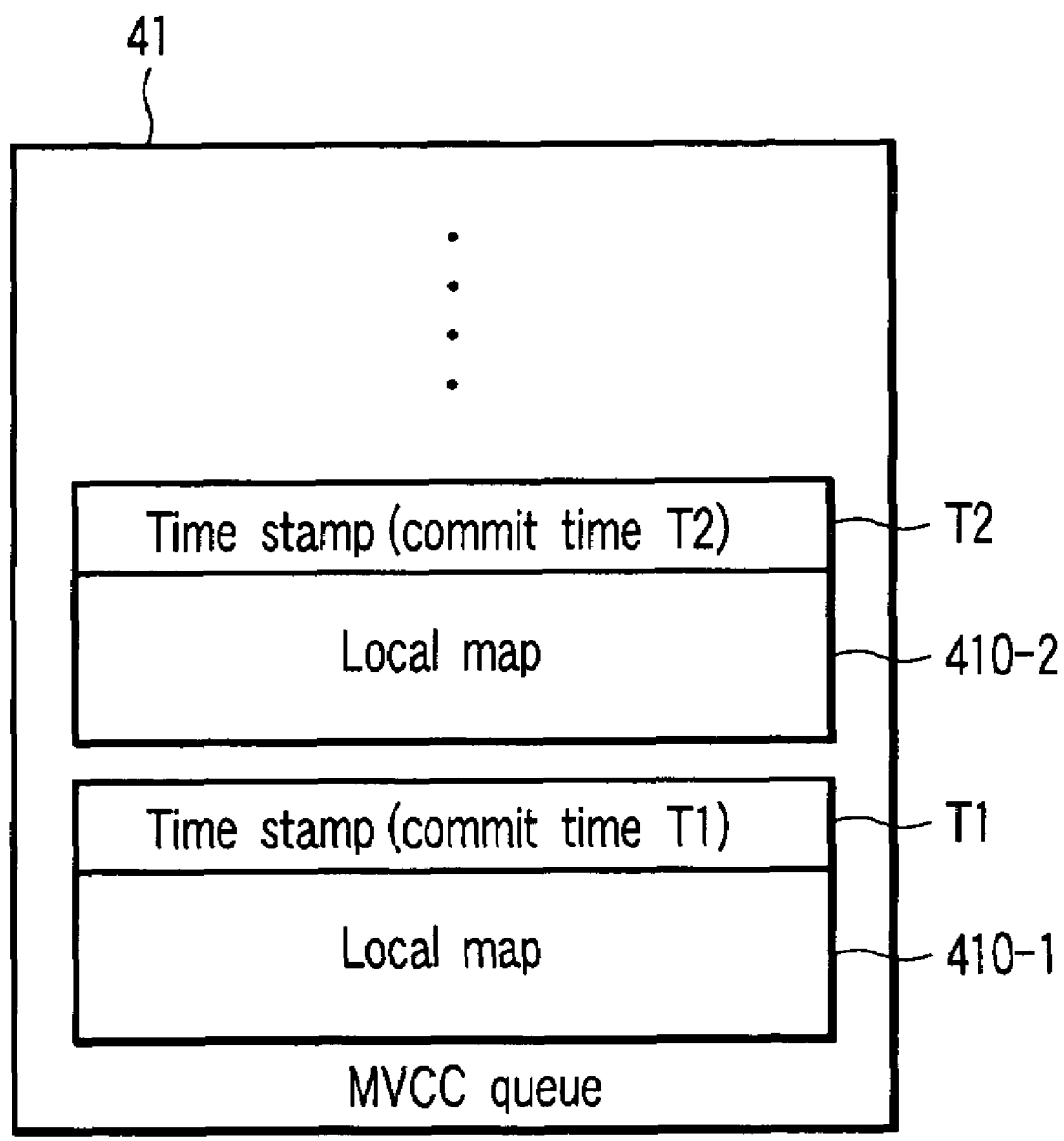
F I G. 14

FILE SYSTEM WITH FILE MANAGEMENT FUNCTION AND FILE MANAGEMENT METHOD

CROSS-REFERENCE TO RELATED APPLICATIONS

This application is based upon and claims the benefit of priority from prior Japanese Patent Application No. 2004-289029, filed Sep. 30, 2004, the entire contents of which are incorporated herein by reference.

BACKGROUND OF THE INVENTION

1. Field of the Invention

The present invention relates to a file system with a file management function including transaction management, and more particularly to a file system with a file management function for updating a file in a temporary writing area, and a file management method for use in the system.

2. Description of the Related Art

In general, transaction management requires four basic conditions, so-called ACID characteristics, i.e., atomicity, consistency, isolation and durability. In particular, atomicity (A), consistency (C) and durability (D) are realized by commit/roll-back and recovery. The method for realizing ACD by a resources manager includes logging and the side-file technique.

<Logging>

Logging is a technique for holding, in a log, the state (UNDO) of data before update and the state (REDO) confirmed by commitment, when the data is updated. In this technique, when a system is finished abnormally, already updated data before commitment is returned to the state assumed before update using an UNDO log. In contrast, non-updated data after commitment is shifted to a definite state using a REDO log. Logging includes various techniques, such as a non-steal technique in which data before commitment is not written, a technique for physically acquiring a log, a technique for logically acquiring a log, etc.

<Side-File Technique>

The side-file technique is described in, for example, Jim Gray and Andreas Reuter, trans. Masaru Kitsuregawa, *TRANSACTION PROCESSING: CONCEPTS AND TECHNIQUES*, Nikkei Business Publications, Inc., Vol. 2, pp. 860-870, 2001, (Jim Gray and Andreas Reuter, *TRANSACTION PROCESSING: CONCEPTS AND TECHNIQUES*, Morgan Kaufmann Publishers, Inc., 1993). In the side-file technique, data (object) is not updated at "the original location", and a new data value is written "to the side", i.e., written at "another location". In this technique, "the original location" and said "another location" belong to the same location in the logical space. In light of this, the side-file technique provides a mechanism for managing the way of holding different images in a time-series manner. The shadow page technique is known as a typical method for realizing the side-file technique. The shadow page technique is characterized in that completely atomic update is performed, therefore failure recovery is not necessary when a system malfunctions.

In the shadow page technique, double combinations of page tables and bit maps are utilized. Each page table has one entry in units of file blocks (pages). Each entry in each page table is provided with a number assigned to a slot that stores the current image of the corresponding block. On the other hand, each bit map is formed of one bit per slot, and indicates whether each slot holds a block image at present.

Further, a directory indicates the combination of the currently effective current-page table and bit map. In the shadow page technique, atomicity is guaranteed by the update of the directory.

The shadow page technique is characterized in that the update of data is performed at "another location", and a plurality of (e.g., a pair of) page tables are utilized. By virtue of this, even if a malfunction occurs at any time between a data update process and a directory update process, such update can be cancelled without any recovery process.

It is known that logging is superior in performance to the shadow page technique. File management systems required to provide high availability must resume services in a short time in case of a failure. Therefore, they often utilize logging to realize high reliability and throughput. However, in logging, it is necessary, in case of a failure, to recover non-updated data from a log by roll forward. This recovery may require a long time (e.g., about several minutes).

On the other hand, the shadow page technique is superior to logging in easiness of install and the speed of recovery from a failure. As mentioned above, in the shadow page technique, no recovery process is necessary, and hence services can be recovered within a short time (e.g., within several seconds). However, the conventional shadow page technique has the following problems in performance:

Page tables of a large size are needed; Fragmentation easily occurs; and Commitment costs high.

Thus, the shadow page technique is not practical. In particular, in the case of using a database of a large scale, the shadow page technique increases the disk access cost and hence conspicuously degrades the performance of the system. The above problems will now be described in detail.

Firstly, in the conventional shadow page technique, when a database of a large scale is used, it is not guaranteed that the two page tables are completely stored in the main memory. For instance, if the page size is 2 kilobytes (KB) and the database size is 1 terabyte (TB), the number of pages is 500 mega (M). In this case, the two page tables must have as large as a size of 500 M×2×4 B=4 GB, assuming that one entry is of 4 bytes (B). Thus, page tables of a large size are needed. If the table size is enormous, the buffer-hitting rate of each page table may be reduced to less than, for example, 90%. Since, on a disk, the page tables are allocated away from data, if the page tables do not hit the buffer and reading of data from the disk is necessary, random access between each page table and database abruptly increases. In this case, the access performance is significantly degraded. Further, even if the buffer-hitting rate is almost 100%, the access to the buffer is increased, which inevitably degrades the access performance.

In addition, if blocks (pages) are reallocated as a result of data update, fragments will occur, thereby increasing random block input/output. Accordingly, the data transfer rate during data access is reduced. Further, during commitment, it is necessary to simultaneously write data to the page tables and the disk. In particular, writing of data blocks becomes randomly. This increases the running cost during commitment. Moreover, to keep consistency in the system, it is necessary to exclude simultaneous writing to the disk (commitment processing). Therefore, update cannot be executed during backup processing. In other words, backup processing cannot be performed during update.

Isolation of transactions is one of the basic conditions for transactions. Specifically, it is necessary to prevent data from being read by another transaction when the data is updated in a certain transaction, and to guarantee the consistency of data at the start of the certain transaction even if a lot of time is required for read processing. In many transaction processing systems, transactions are isolated from each other by locking. In this case, when data is updated, reading of (reference to) the data is waited.

BRIEF SUMMARY OF THE INVENTION

In accordance with an embodiment of the invention, there is provided a file system with a transaction management function. The system comprises a storage unit, a pair of map tables, file management means, update processing means, commit means and real update means. The storage unit includes a storage area in which a file area and a temporary write area are allocated. The temporary write area is used to temporarily store update data in units of pages of the files. The pair of map tables are used to record a list of updated effective pages included in the pages of the files. The updated effective pages are stored in the temporary write area. The pair of map tables are allocated in the storage area. The file management means manages the files stored in the file area. The update processing means updates a page included in the files managed by the file management means. The update processing means updates the page by writing updated data to an unused page acquired from the temporary write area. The commit means alternately writes, to the pair of map tables, a list of the updated effective pages stored in the temporary write area whenever each of transactions is committed. The real update means writes back, to an original page position in the file area, updated data of each of the updated effective pages. The real update means releases the each updated effective page having the updated data thereof written back to the original page position.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view useful in explaining the update of page data in the embodiment;

FIG. 10 is a view useful in explaining a first load reduction method employed in the embodiment;

FIG. 13 is a view useful in explaining a second on-line backup process employed in the embodiment; and FIG. 14 is a view illustrating a data structure example in a multi-version concurrency control (MVCC) queue 41 employed in a modification of the embodiment.

DETAILED DESCRIPTION OF THE INVENTION

Figure 1:
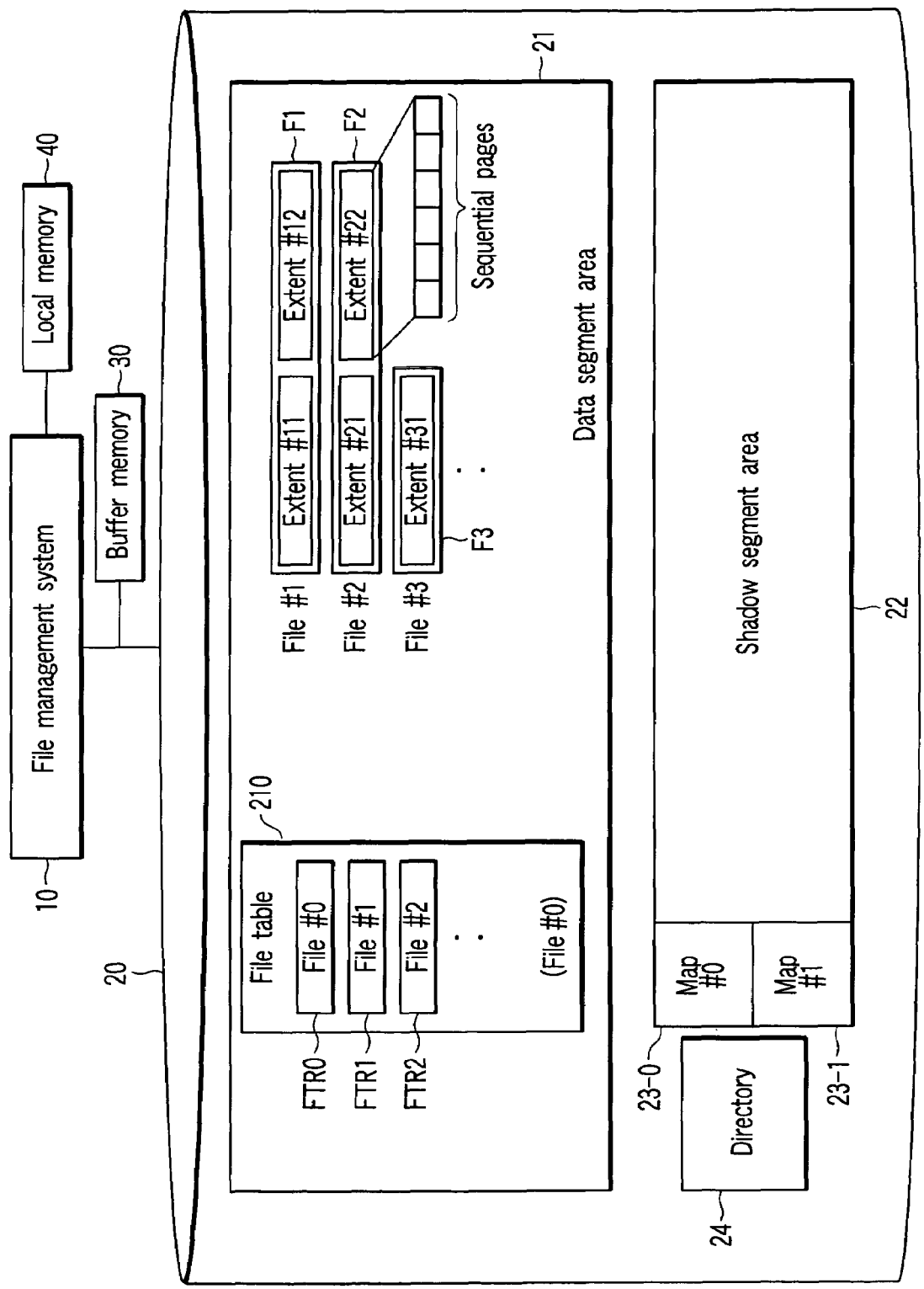
FIG. 1 is a block diagram illustrating the configuration of a file system with a transaction management function according to an embodiment of the invention.

An embodiment of the invention will be described in detail with reference to the accompanying drawings. FIG. 1 is a block diagram illustrating the configuration of a file system with a transaction management function according to the embodiment of the invention. The file system mainly comprises a file management system 10, storage unit 20, buffer memory 30 and local memory 40. The storage unit 20 is a disk storage unit formed of, for instance, a disk drive. The storage area (disk area) of the storage unit 20 is managed in a state in which the unit is mainly divided into a data segment area 21 and shadow segment area 22.

The data segment area 21 is a file area occupied by files. Each file is a management unit allocated to a "logical" chunk stored in a database (DB), and is physically formed of a single or a plurality of extents. Each extent is an allocated physical continuous page area of a designated size. Each file is generated with an initial extent size, and extended in units of extents in accordance with addition of data. FIG. 1 shows a state in which the data segment area 21 stores files F1 (#1), F2 (#2), F3 (#3), . . . .

The data segment area 21 also stores a file table 210. The file table 210 is used to manage the files stored in the data segment area 21. The file table 210 itself is also a file (file #0) stored in the area 21. The file table 210 holds records corresponding to the number of files stored in the area 21. In other words, the file table 210 holds records (file table records) FTR0, FTR1, FTR2, . . . , related to files #0, #1, #2, . . . .

The shadow segment area 22 is a temporary write area that temporarily stores the updated data (updated pages) of each file. In other words, the shadow segment area 22 is a current-page storage area used when it is necessary to update each page of each file. In the conventional shadow page technique, an unused page for a current page is selected from all pages assigned to the database. On the other hand, in this embodiment, any unused page for update is selected from the shadow segment area 22. This method will hereinafter be referred to as "the shadow segment technique", in contrast with the conventional shadow page technique.

As described above, in the embodiment, basically, the location for storing data and that for updating data are not mixed on the disk area, which differs from the conventional shadow page technique. More specifically, in the embodiment, the update of a file is performed in a limited area called the shadow segment area 22 and differing from the file area called the data segment area 21. In the description below, the file area (data segment area 21), in which file update is not performed, will also be referred to as "the original area". However, if an unused page is included in an extent of a file, data can be directly added to this page.

A pair of maps (map tables) 23-0 (#0) and 23-1 (#1) are provided on the disk area of the storage unit 20. The maps 23-0 and 23-1 correspond to page tables in the conventional shadow page technique. The maps 23-0 and 23-1 have the same number of entries as that of pages in the shadow segment area 22, instead of the number of all pages of the database established in the disk area. In this point, the maps 23-0 and 23-1 differ from the page tables in the conventional shadow page technique. The maps 23-0 and 23-1 each hold a list (update list) of effective pages (updated pages) in the shadow segment area 22. The list is an array of ID information items (physical IDs) concerning the effective pages of the shadow segment area 22, and ID information items (physical IDs) concerning the pages in the data segment area 21 corresponding to the effective pages.

A directory 24 is also provided in the disk area of the storage unit 20. The directory 24 indicates which one of the maps 23-0 and 23-1 is the original one (definite one). The map other than the original one is a current map.

The file management system 10 has a file management function including a transaction management function. The file management system 10 is realized by executing a file management program using a computer. The file management program can be beforehand stored in a computer-readable recording medium, or can be downloaded from a network.

Figure 2:
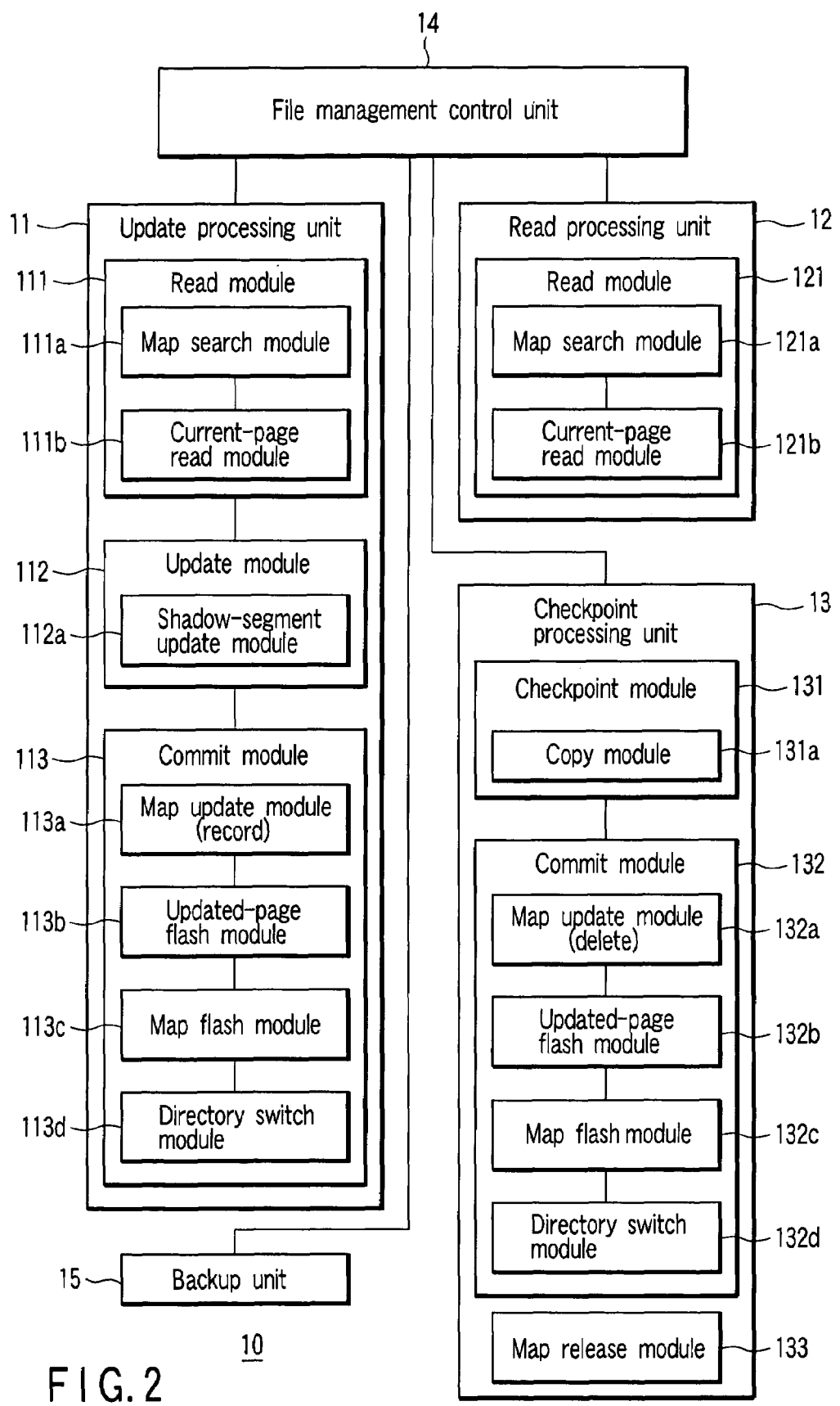
FIG. 2 is a block diagram illustrating the configuration of the file management system 10 appearing in FIG. 1.

FIG. 2 is a block diagram illustrating the configuration of the file management system 10. The file management system 10 comprises an update processing unit 11, read processing unit 12, checkpoint processing unit 13, file management control unit 14, and backup unit 15. The update processing unit 11 manages update transaction. The update processing unit 11 comprises a read module 111, update module 112 and commit module 113. The read module 111 includes a map search module 111a and current-page read module 111b. The update module 112 includes a shadow-segment update module 112a. The commit module 113 includes a map update module 113a, updated-page flash module 113b, map flash module 113c, and directory switch module 113d.

The read processing unit 12 comprises a read module 121. The read module 121 includes a map search module 121a and current-page read module 121b. The read module 121 of the read processing unit 12 corresponds to the read module 111 of the update processing unit 11. Accordingly, if one of the read modules 111 and 121 is commonly used by the update processing unit 11 and read processing unit 12, the other of the read modules 111 and 112 can be omitted.

The checkpoint processing unit 13 comprises a checkpoint module 131, commit module 132 and map release module 133. The checkpoint module 131 includes a copy module 131a. The commit module 132 includes a map update module 132a, updated-page flash module 132b, map flash module 132c and directory switch module 132d. The commit module 132 of the checkpoint processing unit 13 corresponds to the commit module 113 of the update processing unit 11. As described later, the difference therebetween lies in that the map update module 113a of the commit module 113 stores a record in the map for update, whereas the map update module 132a of the commit module 132 deletes a record from the map for update. Therefore, one of the commit modules 113 and 132 may be commonly used by the update processing unit 11 and checkpoint processing unit 13, with both the record-storing function and the record-deleting function imparted to one of the map update modules. In this case, the other of the commit modules 113 and 132 can be omitted.

The file management control unit 14 controls the update processing unit 11 and read processing unit 12 in accordance with a request from each application that utilizes the file system of FIG. 1. A request from an application is, for example, a request to start a transaction, or to commit update processing in the transaction. The file management control unit 14 also controls the checkpoint processing unit 13b generating a transaction for checkpoint processing. The file management control unit 14 also controls on-line backup performed by the backup unit 15. The backup unit 15 has a function for executing two types of backup operations called first and second on-line backup operations. The first and second on-line backup operations will be described later.

Referring again to FIG. 1, the buffer memory 30 is used as a disk cache memory for temporarily storing page data transferred between the file management system 10 and storage unit 20. The local memory 40 is used to temporarily store data necessary for the file management of the file management system 10.

A description will be given of the outline of a file and extent used in the shadow segment technique that is employed in the system of FIG. 1. The embodiment employs an extent technique as a method for allocating each page of each file to the physical disk. The extent technique is characterized in that:

Each file comprises a plurality of physical continuous areas (called extents); and When the data area becomes insufficient in accordance with an increase in data, new continuous areas are acquired in units of extents.

Figure 3:
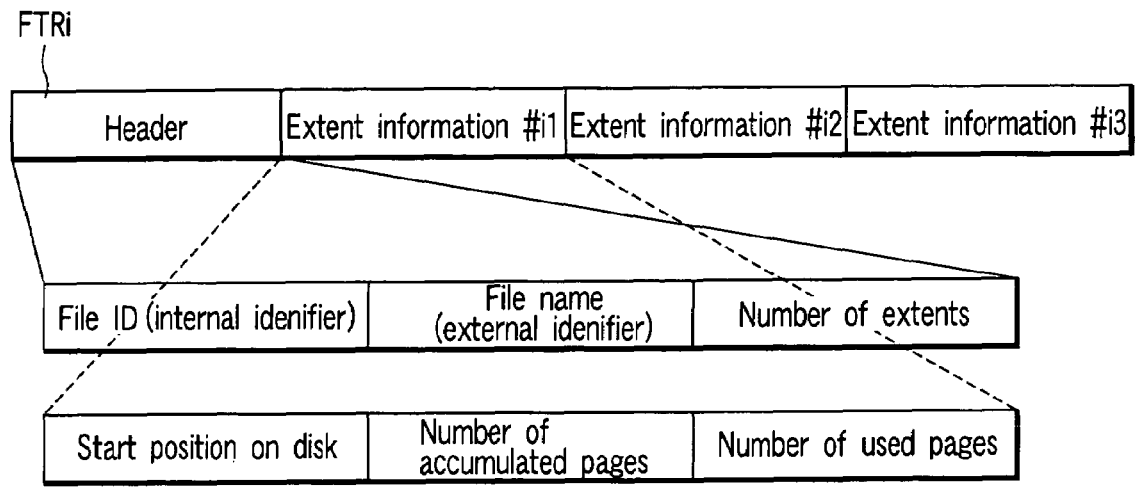
FIG. 3 is a view illustrating the data structure of record FTRi, related to file #i (Fi), held in the file table 210 appearing in FIG. 1.
Figure 4:
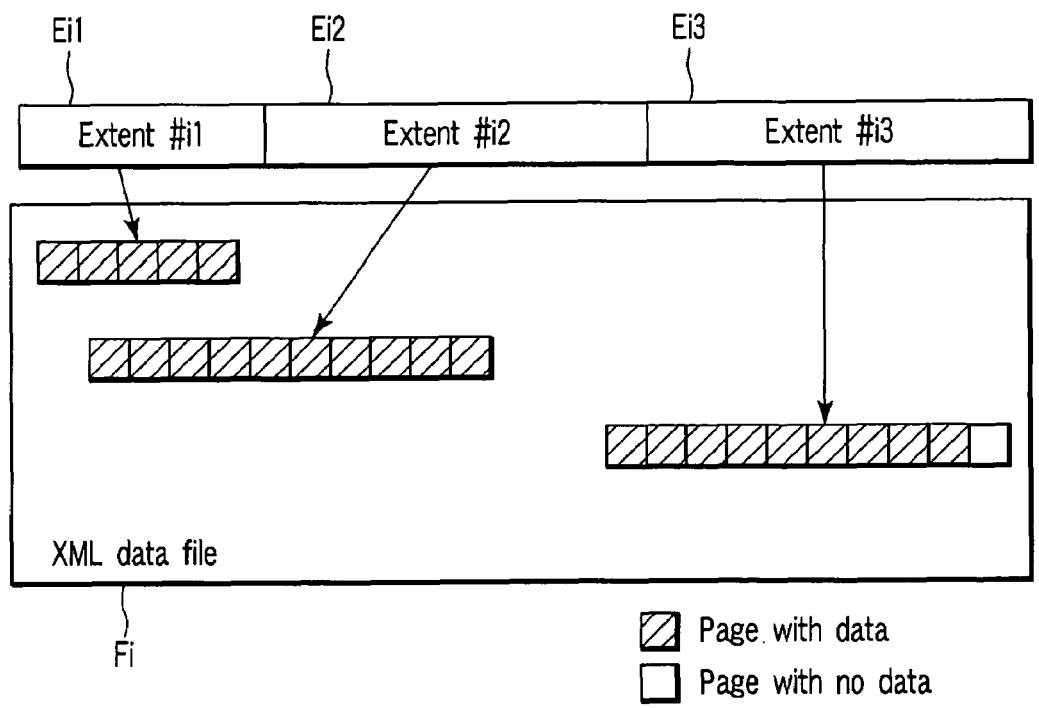
FIG. 4 is a view illustrating the relationship between file #i (Fi) and extents.

FIG. 3 shows the data structure example of record (file table record) FTRi, concerning file #i (Fi), held in the file table 210. FIG. 4 shows the relationship between file #i (Fi) and extents. In FIGS. 3 and 4, it is assumed that file #i (Fi) is formed of three extents Ei1 (#i1), Ei2 (#i2) and Ei3 (#i3).

Record FTRi includes a header, and information (extent information) concerning each extent included in file #i (Fi) corresponding to record FTRi. The header includes an ID (file ID) assigned to file #i (Fi) and called an internal identifier, and the name (file name) of file #i (Fi) called an external identifier, and information indicating the number of extents that provide file #i (Fi). The extent information includes information indicating the start position, on the disk (disk area), of an extent corresponding to the extent information, and information indicating the cumulative number of pages allocated (reserved) and a used-page position. The used-page position indicates the position of the rearmost used page in the extent corresponding to the extent information, with respect to the head of the file (the leading page of the leading extent). In the example of FIG. 4, the numbers of pages of extents Ei1 (#i1), Ei2 (#i2) and Ei3 (#i3) are 5, 10 and 5, respectively. Further, only the last page of Ei3 (#i3) is not used. Accordingly, the accumulative numbers of pages of extents Ei1 (#i), Ei2 (#i2) and Ei3 (#i3) are 5, 15 and 25, respectively, and the used-page positions of extents Ei1 (#i1), Ei2 (#i2) and Ei3 (#i3) are 5, 15 and 24, respectively.

In the process described below, it is assumed that each file includes extents providing each file, i.e., continuous regions allocated (reserved). In other words, the embodiment is characterized by the following point. In the conventional shadow page technique, a non-used page can be used by any function. However, in the embodiment, any page included in the area allocated (reserved) by the extent technique cannot be used for any purpose other than the purpose for which the area is allocated, even if the area contains an unused page in which no real data is written.

Referring to FIG. 5, a description will be given of an operation example of the embodiment performed when data in a page is updated. In this case, assume that a request to start transaction TR is issued from an application utilizing the file system of FIG. 1 to the file management control unit 14 of the file management system 10. Assume further that the data to be updated by transaction TR is included in file

2 (F2), that the page to be updated is the second page PD1 of extent #22, and that the physical ID of this page is 1000.

In the shadow segment technique, it is necessary to reserve the original page as a shadow page. Therefore, update is performed by copying data (image) of the to-be-updated page PD1 to a page in the shadow segment area 22, and updating the data in the page. To this end, the map search module 111a included in the read module 111 of the update processing unit 11 acquires an unused page for update from the shadow segment area 22. Specifically, such an unused page is acquired by searching the original one of the maps 23-0 and 23-1. Assume here that the original map (the map fixed as an original one) at the start of transaction TR is the map 23-0 (#0), and the current map is the map 23-1 (#1). Further, assume that page PS1 is detected as an unused page, and the ID of page PS1 in the shadow segment area 22 is set to SS1.

The current-page read module 111b of the read module 111 reads data from the to-be-updated page PD1 (step S1). The image of the page PD1 read by the current-page read module 111b is copied to page PS1 in the shadow segment area 22. However, in the embodiment in which the buffer memory 30 is provided between the file management system 10 and the storage unit 20, this copy process is actually performed on the page (block) in the buffer memory 30 that corresponds to page PS1.

The shadow-segment update module 112a included in the update module 112 of the update processing unit 11 updates page PS1 (current page) in the shadow segment area 22 (step S2). Actually, however, this update process is also performed on the page (block) in the buffer memory 30 that corresponds to page PS1. At this time, the shadow-segment update module 112a functions as a request-recording module. That is, the shadow-segment update module 112a stores (records), in a temporary map, information indicating that the page image (the image of the current page) acquired by updating page PD1 exists in page PS1 (current page) in the shadow segment area 22. The temporary map is allocated in the local memory 40 in relation to transaction TR. The information stored in the temporary map includes the physical ID (=1000) of page PD1 and the physical ID (=SS1) of page PS1. This information is added to the current map when transaction TR is finished. Recording the information in the temporary map of the local memory 40 that corresponds to transaction TR will hereinafter be referred to as "the additional request record". Concerning each page in the data segment area 21, the physical ID indicates the relative position of each page in the data segment area 21. Further, concerning each page in the shadow segment area 22, the physical ID indicates the relative position of each page in the shadow segment area 22.

Assume here that commitment processing for committing the update operation in transaction TR to finish the transaction has been requested from the application. As mentioned above, the original map at the start of transaction TR is the map 23-0 (#0). In this case, the map update module 113a included in the commit module 113 of the update processing unit 11 copies the map 23-0 to the map 23-1 (#1). The map update module 113a additionally records, in the map 23-0 (#0), a record concerning the physical ID=1000 in accordance with the information (map addition request) stored in the temporary map (step S3). As described above, the temporary map is allocated in the local memory 40 in relation to transaction TR. The record related to the physical ID=1000 includes the physical ID (=1000) of page PD1 and the physical ID (=SS1) of page PS1. This record indicates that updated page SS1 corresponding to page PD1 with physical ID=1000 exists in the shadow segment area 22. The update of the map for adding a record is actually performed on the pages (blocks) of the buffer memory 30 that correspond to the pages to which the maps 23-0 (#0) and 23-1 (#1) are allocated.

If the buffer memory 30 contains any updated page that is not reflected in the shadow segment area 22 (such a page is called a "dirty page"), the updated-page flush module 113b of the commit module 113 flushes it to the corresponding page of the shadow segment area 22. Similarly, if the buffer memory 30 contains any page of the updated map that is not reflected in the map 23-1, the map flush module 113c of the commit module 113 flushes the updated map to the map 23-1. At this stage, the directory switch module 113d of the commit module 113 operates the directory 24 to switch the original map from the map 23-0 (#0) to the map 23-1 (#1) (step S4). This is the termination of the commitment process.

In the above process, the following two points are important: Firstly, a current page for update is selected from the shadow segment area 22. In other words, only a page of the shadow segment area 22 is used as a current page for update. Secondly, only a record including the physical ID of a current page (updated page) that has its image reflected in the shadow segment area 22 is added to the map 23-i (in this case, i=1). In other words, any page in the shadow segment area 22, which is identified by a physical ID that is not stored in the map 23-i, is an unused page. The record added to the map 23-i includes the physical ID of the updated page in the shadow segment area 22, and the physical ID of the original page in the data segment area 21 that corresponds to the update page.

Until a transaction is committed by an update operation in the transaction, data as transaction local is generated. To manage this data, the above-described temporary map stores map information concerning a document page updated by the transaction. The map information includes the physical ID of the document page in the data segment area 21, and the physical ID of the corresponding page in the shadow segment area 22. The temporary map is generated when a transaction is started, and is deleted when the transaction is finished (committed/rolled back).

In the embodiment, the shadow segment technique is used as a recovery technique, and its base technique is a shadow page technique. In the shadow page technique, when an update commitment process is performed, the following processes (1) to (3) are required:

(1) Writing of data (page data) to a disk;
(2) Copy of a map, update, data writing; and
(3) Free-bit-page (FBP) process for managing an unused area, and its shadow process.

The load required for inputting/outputting (I/O) a page to/from a disk is relatively high compared to that required for memory access or computation. Commitment processing may reduce the response of processing since it includes commitment processing serialization and the above-described map processing. Further, update of a map must be performed in units consistent through each transaction. Therefore, the method for directly updating a map makes it impossible to simultaneously perform a plurality of update processes.

In light of this, update information concerning each transaction is recorded in the temporary map in units consistent through each transaction, and the current map is updated in accordance with the data recorded in the temporary map, when a request to commit each transaction is issued. Further, in the embodiment, a plurality of requests for commitment are simultaneously processed. Simultaneous processing of a plurality of commit requests will now be referred to as group commitment. Although delay of commitment inevitably increases the average response time of transactions, the overhead (the time required for preparation and execution of the I/O process of each transaction, settlement after completion of the process, etc.) of each transaction is extremely reduced. In general, when a low-load transaction is processed, commitment is not delayed, while when a high-load transaction is processed, commitment is delayed by a certain period. This enables an appropriate throughput to be obtained. In the embodiment, a request to perform another commitment process, issued during the execution of group commitment, is delayed until the group commitment process is completed, and said another commitment process is performed together with other commitment processes, when the next group commitment process is performed. Thus, an appropriate throughput is obtained. Delay time control is not performed.

Figure 6:
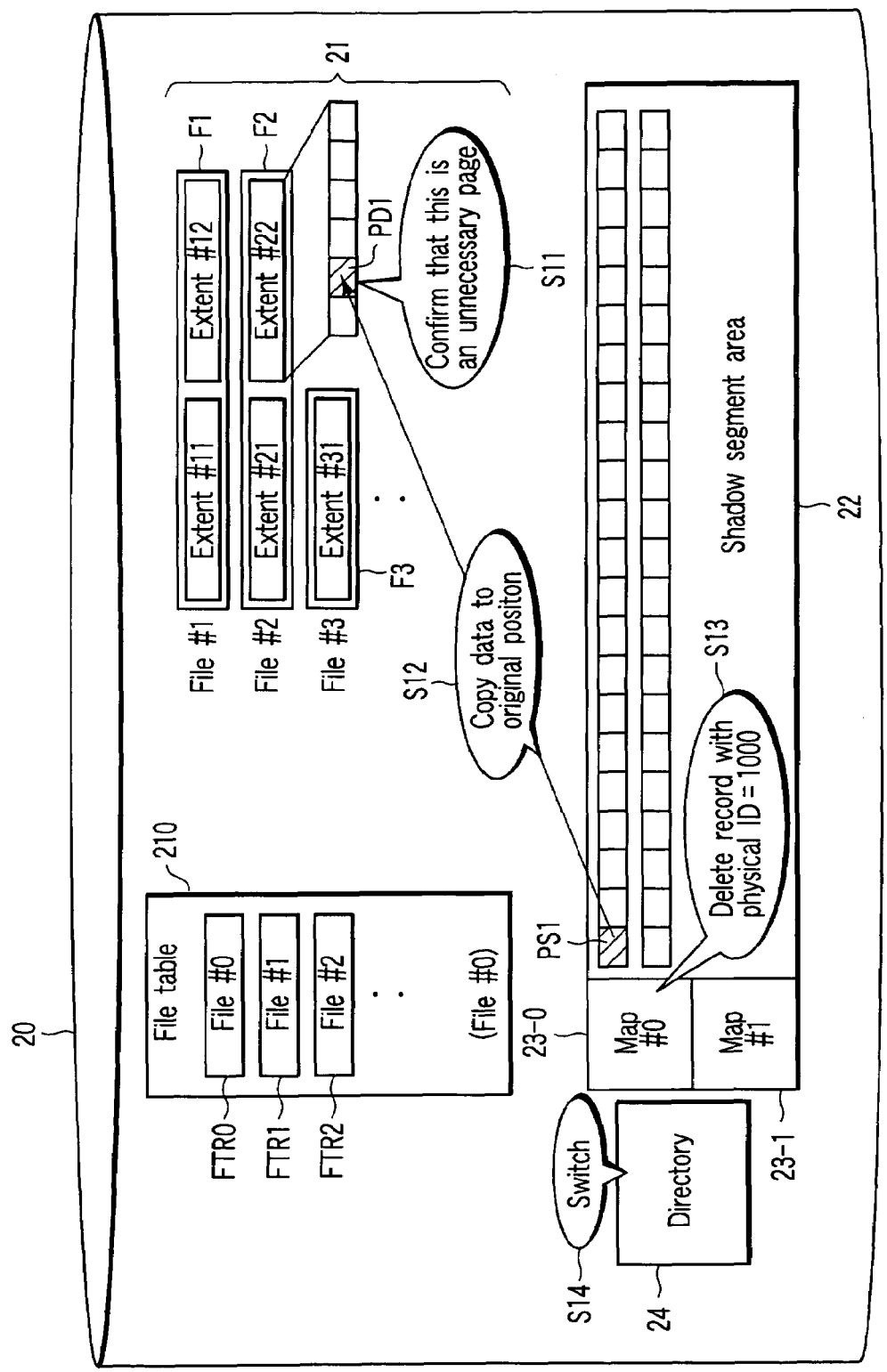
FIG. 6 is a view useful in explaining checkpoint processing in the embodiment.

Referring then to FIG. 6, a description will be given of a checkpoint process performed in the embodiment. It can be understood from the checkpoint process that the above-mentioned two points are significantly important. The checkpoint process aims to return an already updated page image in the shadow segment area 22 to the original position in the data segment area 21 (the original position is included in a continuous area), thereby increasing the rate of the disk I/O process.

Assume here that the checkpoint process (real update process) in the embodiment is independent transaction TRc generated in the file management control unit 14 itself of the file management system 10. That is, in the embodiment, checkpoint processing executed by a transaction is prevented from being executed by any other transaction. However, concerning the commitment process, the group commitment process is utilized to perform batch processing. In the embodiment, transaction TRc is generated when the shadow segment area 22 contains few unused pages, for example, when the ratio of the number of unused pages to the number of all pages is less than a preset value. Alternatively, transaction TRc may be generated periodically.

Assume that the directory 24 indicates that the map 23-1 (#1) is the original one. In this case, the copy module 131a included in the checkpoint module 131 of the checkpoint processing unit 13 refers to the original map 23-1 (#1), thereby acquiring the physical ID of the original page image in the data segment area 21 that corresponds to the updated page image (the image of the current page) in the shadow segment area 22. Subsequently, the copy module 131a confirms whether no transaction needs the original page image in the data segment area 21 identified by the acquired physical ID (step S11). In this embodiment, assume that the current page in the shadow segment area 22 is represented by PS1, and the original page in the data segment area 21 that corresponds to the current page PS1 is page PD1 with the physical ID=1000. In this case, the copy module 131a copies an image of the current page PS1 in the shadow segment area 22, to its original position in the data segment area 21, i.e., to page PD1 (step S12). That is, the copy module 131a performs a real update process in which the image of the current page PS1 in the shadow segment area 22 is written back to its original position in the data segment area 21. Actually, however, this real update process (copy process) is performed on the page in the buffer memory 30 that corresponds to page PD1. The copy module 131a has a deletion-request record function. Using this function, during the execution of the real update process, the copy module 131a records, to a temporary map corresponding to transaction TRc and allocated in the local memory 40, information indicating that the image of the current page PS1 is reflected in page PD1 in the original data segment area 21. This information includes the combination of the physical ID (=1000) of page PD1 and the physical ID (=SS1) of the current page PS1. Further, this information is deleted from the current map when transaction TRc for checkpoint processing is finished. Therefore, recording of this information to the temporary map in the local memory 40 that corresponds to transaction TRc will be referred to as the "deletion-request record".

Assume here that transaction TRc for checkpoint processing is finished after the above-described real update process (copy process) is repeated on some current pages (e.g. all current pages) included in the shadow segment area 22. In this case, commitment processing for committing the operation of transaction TRc is started by the commit module 132 of the checkpoint processing unit 13. Specifically, the map update module 132a of the commit module 132 copies, to the map 23-0 (#0), the map 23-1 (#1) as the original map at the start of transaction TRc for checkpoint processing. After that, the map update module 132a deletes the record related to physical ID=1000 in accordance with the information (deletion request) stored in the temporary map (step S13). The temporary map is allocated in the local memory 40 in relation to transaction TRc. The record related to physical ID=1000 includes the combination of the physical ID (=1000) of page PD1 and the physical ID (=SS1) of page PS1. The map update operation for deleting the record is performed on the pages (blocks) in the buffer memory 30 that correspond to the pages to which the maps 23-0 (#0) and 23-1 (#1) are allocated.

If the buffer memory 30 contains any updated page that is not reflected in the data segment area 21, the updated-page flush module 132b of the commit module 132 flushes it to the corresponding page of the data segment area 22. Similarly, if the buffer memory 30 contains any page of the updated map that is not reflected in the map 23-0, the map flush module 132c of the commit module 132 flushes the updated map to the map 23-0. At this stage, the directory switch module 132d of the commit module 132 operates the directory 24 to switch the original map from the map 23-1 (#1) to the map 23-0 (#0) (step S14). This is the termination of the commitment process.

The above-described two important points will be confirmed again based on the checkpoint process. The first point is that only a page of the shadow segment area 22 is used for a current page for update. As pointed out above, in the conventional shadow page technique, a new unused page is detected and used for update. Accordingly, page fragmentation will easily occur. In contrast, in the shadow segment technique of the embodiment, a current page is provided in the shadow segment area 22, and the image of the current page is returned to the original continuous area by checkpoint processing, thereby suppressing occurrence of fragments due to an update process.

The second point is that the map 23-$i$ (i is 0 or 1) has a record concerning a page that has its current image in the shadow segment area 22. As indicated above, in the shadow page technique, a huge table (page table) is needed for mapping of logical IDs and physical IDs, depending upon the number of pages. In contrast, in the shadow segment technique of the embodiment, only records concerning updated pages are held, which significantly reduces the map size. The checkpoint process tidies up the map (map table) itself, thereby suppressing enlargement of the map.

Figures 7, 8:
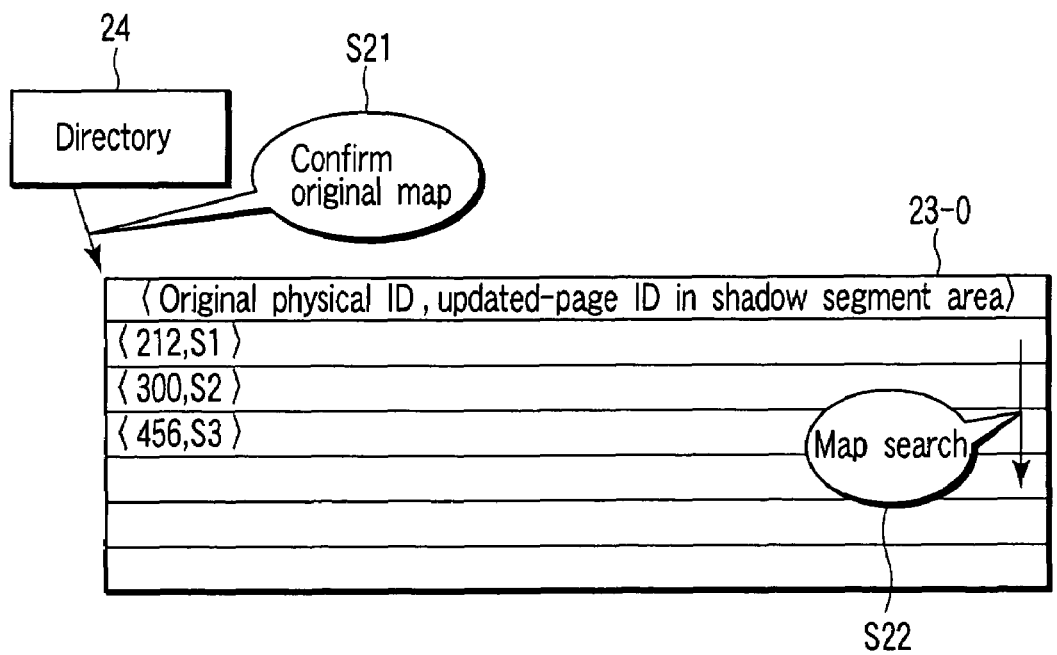
FIG. 7 is a view illustrating the extent structure of file #2 (F2) indicated by file table record FTR2 in the file table 210.
FIG. 8 is a view useful in explaining data read processing in the embodiment.

Referring to FIGS. 7 and 8, a description will be given of data read processing (reference processing) performed for, for instance, data search in transaction TR, using, as an example, the case of reading a page with serial number 10 in file #2 (F2). FIG. 7 is a view illustrating the extent structure of file #2 (F2) indicated by file table record FTR2 in the file table 210. FIG. 8 is a view useful in explaining data read processing. In the case of FIG. 7, file #2 (F2) is assumed to be formed of three extents #21, #22 and #23, which differs from the case of FIG. 1. In other words, assume that file #2. (F2) corresponds to file #i (Fi) (i=2) shown in FIG. 4.

Firstly, the read module 121 of the read processing unit 12 reads file table record FTR2 from the file table 210. Subsequently, the read module 121 recognizes, from extent information included in the record and indicating the extent structure of file #2 (F2), that the page with serial number 10 is the fifth page of extent #22, i.e., the page with physical ID=215.

The read module 121 determines whether this page is already updated by transaction TR, depending upon whether the information (addition request) stored in the temporary map corresponding to transaction TR contains information indicating the page with physical ID=215. The temporary map is allocated in the local memory 40 in relation to transaction TR. If the page with physical ID=215 is the page updated by transaction TR, the current-page read module 121b of the read module 121 reads data from the updated page.

On the other hand, if the page with physical ID=215 is not the page updated by transaction TR, the map search module 121a of the read module 121 refers to the directory 24 to confirm whether the map 23-0 or 23-1 is the original map (step S21). In this case, assume that the map 23-0 is the original one. The map search module 121a searches the original map 23-0 to determine whether it stores a record including physical ID=215. This means a determination as to whether a current page (updated page) corresponding to the page with physical ID=215 exists in the shadow segment area 22. If the record including physical ID=215 is stored, the map search module 121a fetches, from the record, the physical ID of the current page corresponding to physical ID=215, and transfers it to the current-page read module 121b of the read module 121.

The current-page read module 121b reads data from the current page in the shadow segment area 22 that is indicated by the physical ID sent from the map search module 121a. However, in the example of FIG. 8, the map 23-0 does not store the record including physical ID=215. If the page with physical ID=215 is not a page updated in transaction TR, and if the original map 23-0 does not store the record including physical ID=215, the current-page read module 121b directly reads the data of the page with physical ID=215.

Assume that the data size of file #i (Fi) is gradually increased to use all extent area included therein. In this case, it is necessary to expand the extent area, i.e., to secure a sufficient physical continuous area, and then to reflect information indicating this in file table record FTRi. An extent expansion process will now be described.

Firstly, assume that the extent expansion process in the embodiment is independent transaction TRe generated in the file management system 10 itself, like the above-described checkpoint process. This is because even if a transaction that requires extent expansion is rolled back, it is very possible that another transaction will require extent expansion in near future (the principle of locality), therefore no problem will occur even if extent expansion is completed.

On the other hand, if a certain transaction establishes exclusive locking of that page of the file table 210 for extent expansion, a problem will occur in parallel operation of transactions. This is because until the transaction that establishes exclusive locking is finished, the reference to that page of the file table 210 by any other transaction is waited. Accordingly, although extent expansion is a process performed when a certain transaction is performed, atomicity concerning the extent expansion of the transaction is not guaranteed. However, this disadvantage occurs only within the database management, and no influence of extent expansion occurs externally.

Figure 9:
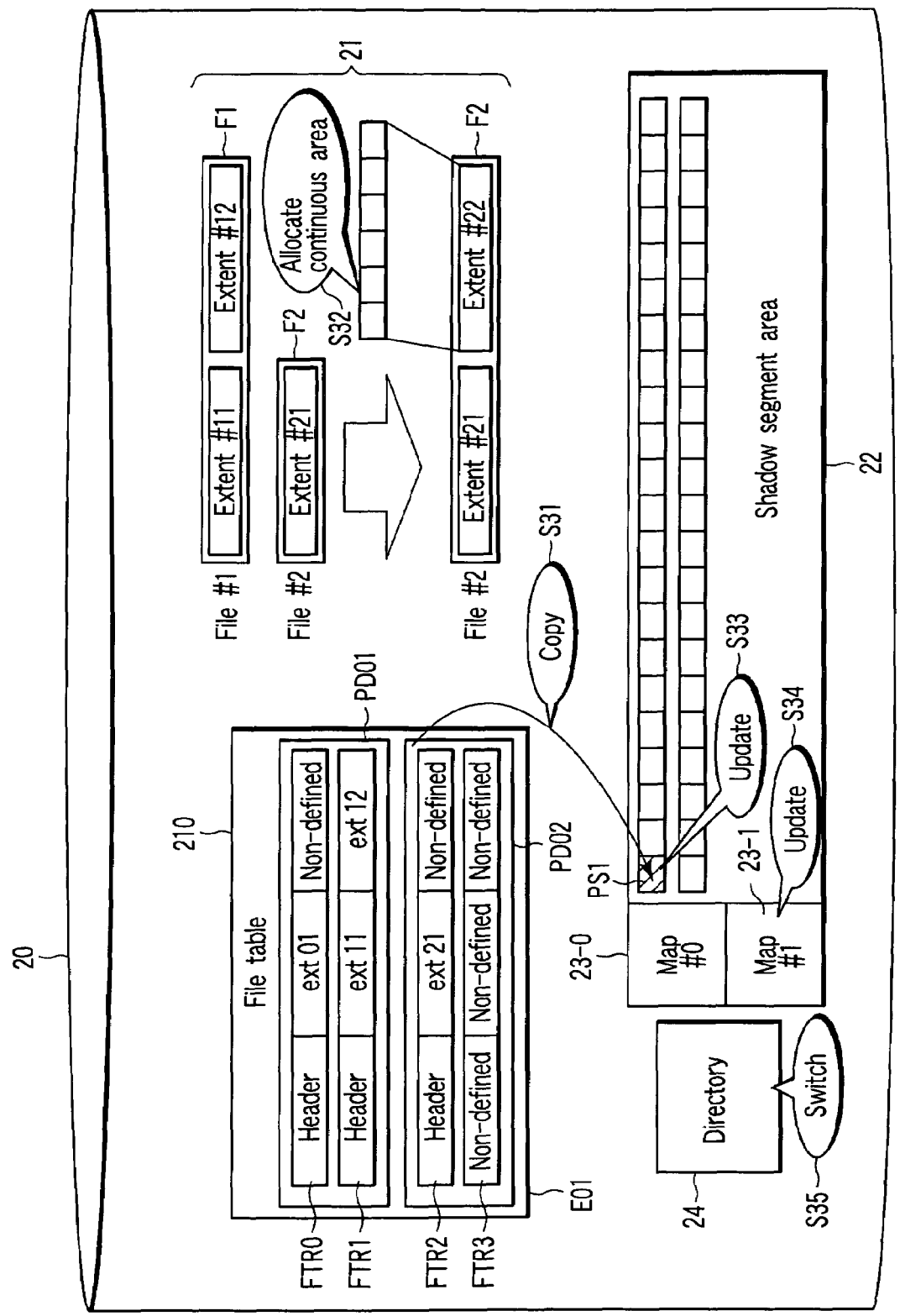
FIG. 9 is a view useful in explaining extent expansion processing in the embodiment.

Referring to FIG. 9, a description will be given of the extent expansion process, using, as an example, the case where there is no sufficient area for storing data. As previously described, the file table 210 is one (file #0) of the files, and therefore the same extent expansion process as in another file is performed on the file table. Assume here that the page, in which a record (file table record FTR2) related to file #2 (F2) and stored in the file table 210 exists, is page PD02 with physical ID=2. Assume also that the extent containing page PD02 is extent E01.

FIG. 2 does not show an extent-expansion processing unit for performing an extent expansion process. Since, however, this extent expansion process is performed in substantially the same manner as the update process by the update processing unit 11, a description will be given assuming, for facilitation of the description, that the update processing unit 11 performs the extent expansion process. The map search module 111a searches the shadow segment area 22 for an unused page for updating page PD02. After that, the map search module 111a copies an image of page PD02 to the searched unused page (step S31). Assume here that the image of page PD02 is copied to page PS1 in the shadow segment area 22 as shown in FIG. 9.

The update module 112 allocates a continuous area of a size, designated as an extent expansion size, in the data segment area 21 of the storage unit 20 (step S32). The update module 112 updates file table record FTR2 of file #2 (F2) in page PS1, so that the area allocated at step S32 is treated as expanded extent #22 for file #2 (F2) (step S33). In this case, extent information indicating the area (extent #22) allocated at step S32 is added to the second extent column of file table record FTR2.

A commitment process for finishing transaction TRe used for the above-described extent expansion process will be described. Firstly, assume that the original map is the map 23-0 (#0) at the start of transaction Tre. In this case, the commit module 113 copies the map 23-0 (#0) to the map 23-1 (#1), and adds (records), to the map 23-1 (#1), a record related to physical ID=2 (step S34). The record related to physical ID=2 includes the combination of the physical ID (=2) of page PD02 and the physical ID of page PS1. After that, the commit module 113 switches the original map from the map 23-0 (#0) to the map 23-1 (#1) (step S36). This is the termination of the commit process.

As described above in detail, the shadow segment technique of the embodiment is very advantageous in that it suppresses the map size and the occurrence of fragmentation due to update. However, if a large amount of registration, such as batch registration, is performed, the load of the checkpoint process on the system becomes very high. For instance, in the checkpoint process performed in a state in which all pages of the shadow segment area 22 serve as current pages, it is necessary to copy pages equal to the size of the shadow segment area 22. In light of this, the embodiment employs the following first and second load reduction methods to reduce the load of the checkpoint process.

Firstly, the first load reduction method will be described with reference to FIG. 10. The first load reduction method is characterized by the way of adding data to an unused page in an extent. Specifically, the first load reduction method is characterized in that data of a to-be-updated page in the data segment area 21 is not copied to the shadow segment area 22, and data is directly added to the position of the to-be-updated page. If data addition has failed, recovery is realized by not updating the maximum used effective page number (used-page position) included in the corresponding file table record in the file table 210.

Assume here that file #1 (F1) is formed of two extents #1 and #2 each having 4 pages, as shown in FIG. 10. Assume also that the used-page position of extent #2 is 5, i.e., that no data is stored in the second page, et seq. in extent #2. The extent structure of file #1 (F1) is indicated by extent information in file table record FTR1 stored in the file table 210. That is, the extent information defines the fact that the used-page position of extent #2 is 5.

In this state, assume that during a certain transaction TR, addition of data to file #1 (F1) occurs, and it is necessary to write the data to a page position of "6" following the used-page position, i.e., the second page of extent #2. Since the start physical ID of extent #2 is 211, the physical ID of the second page of extent #2 is 212. At this time, no effective data is stored in the page with physical ID=212. This is guaranteed by the above-mentioned fact that the "used-page position" indicated by the extent information of file table record FTR1 concerning extent #2 is 5.

In this case, the update module 112 does not write data to the shadow segment area 22, but directly writes data to the page position with physical ID=212 in the data segment area 21 (step S41). After a while, assume that a commitment request is issued from the application to finish transaction TR, and data writing is normally completed. In this case, the commit module 113 switches, from "5" to "6", the "used-page position" indicated by the extent information of file table record FTR1 concerning extent #2 (step S42). In contrast, if data writing to the position with physical ID=212 has failed, the commit module 113 maintains, at 5, the information in the "used-page position", which is the completion of recovery.

As described above, in the first load reduction method, when addition of data to an unused page in an extent is necessary, data is directly added to the position of the unused page. In other words, since the first load reduction method does not use the shadow segment area 22, the checkpoint process can be omitted, and reference to maps for searching can be omitted.

Figure 11:
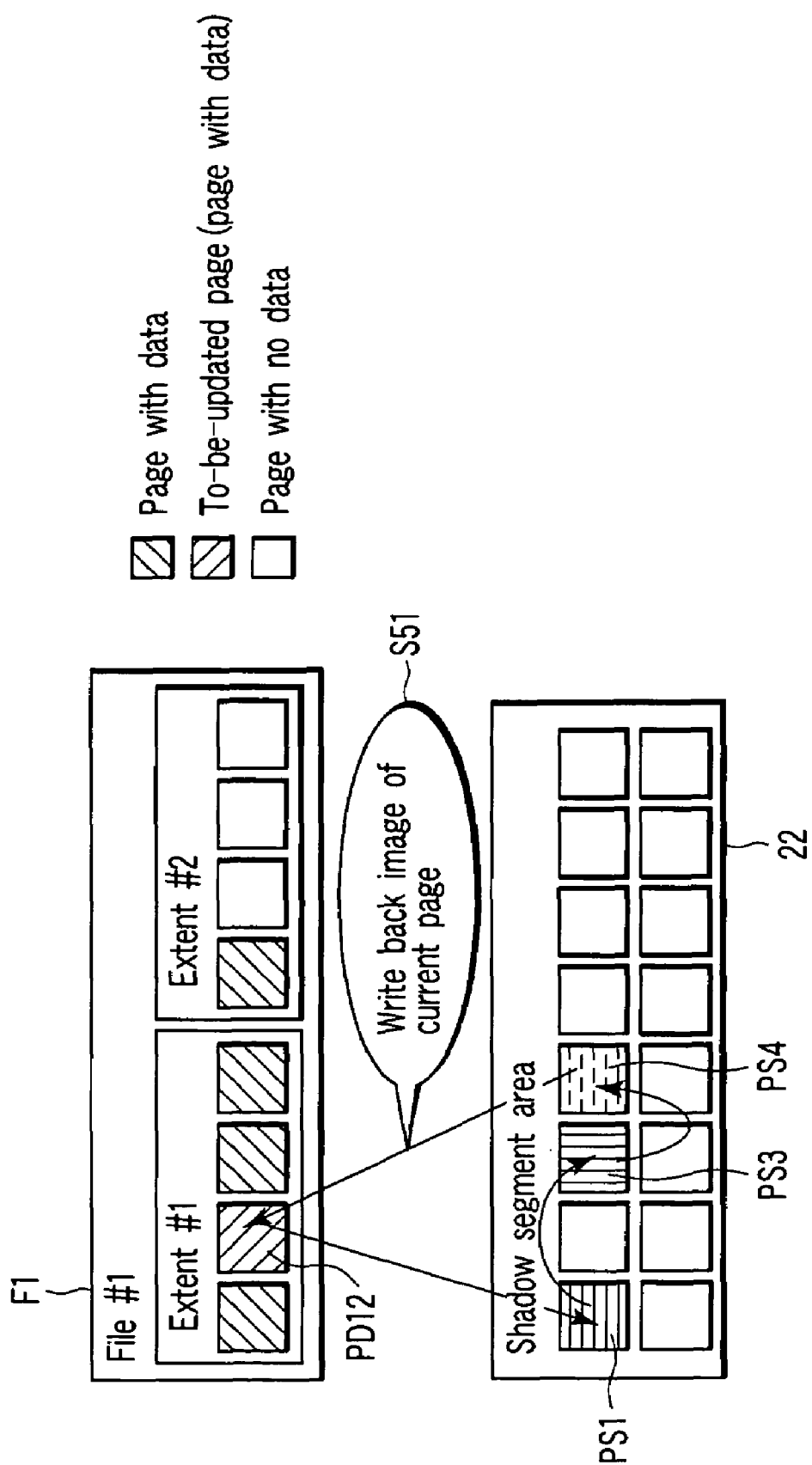
FIG. 11 is a view useful in explaining a second load reduction method employed in the embodiment.

Referring to FIG. 11, the second load reduction method will be described. The second load reduction method is characterized by the process performed when the same page is further updated before write-back of data to the data segment area 21 by the checkpoint process occurs. In other words, the second load reduction method is characterized in that the page image that should be written back by checkpoint processing is limited to the latest (i.e., current) page image. When the same page is updated several times by a plurality of transactions before checkpoint processing occurs, the past versions of the page are sequentially stored in the shadow segment area 22.

Assume here that page PD12 in the leading extent #1 of file #1 (F1) is updated three times as shown in FIG. 11. In this case, as shown in FIG. 11, firstly, the initially updated image of page PD12 is held in, for example, page PS1 in the shadow segment area 22. Subsequently, the next-updated image of page PD12 is held in, for example, page PS3 in the shadow segment area 22. Further, the lastly-updated image of page PD12 is held in, for example, page PS4 in the shadow segment area 22.

In this state, assume that checkpoint processing according to the second reduction load method occurs. In this checkpoint process, when transactions that refer to the old page images are finished, the latest (i.e., current) page image is written back to the original extent area in the data segment area 21. In the example of FIG. 11, concerning page PD12 in the data segment area 21, a plurality of old page images are stored in the shadow segment area 22. However, as long as the transactions referring to the old page images are finished, the necessary data is only the latest page image held in page PS4 in the shadow segment area 22. Therefore, the checkpoint module 131 of the checkpoint processing unit 13 writes back only the latest page image held in page PS4 (step S50). The pages holding the old page images are managed as unused pages.

As is clear from the above, the shadow segment technique of the embodiment differs from the conventional shadow page technique in structure and advantage as follows:

(1) The size of the map (map table) corresponding to the page table in the shadow page technique does not depend upon the size of the database. In contrast, the shadow page technique has a problem in which the page table size increases as the database size increases. In the shadow segment technique of the embodiment, an updated page is allocated to an area, called the shadow segment area 22, for temporarily storing updated data. In this case, page conversion (physical ID conversion) is performed not using a table dedicated to the entire database, but using an associative memory for updated pages. The thus-constructed shadow segment technique enables the size of the map table to be reduced to a value corresponding to the amount of updated data. In particular, when checkpoint processing is finished, the number of records in the map table becomes zero. Thus, it is advantageous that overhead does not occur during page conversion in a map search process.

(2) File fragmentation can be avoided. Specifically, in the embodiment, file fragmentation temporarily occurs during data update. However, the continuity of an original extent can be restored by checkpoint processing. That is, file fragmentation can be prevented by performing real update processing from the shadow segment area 22 to the data segment area (file area) 21, using the combination of the file management technique based on the extent technique, and the shadow page technique, and using checkpoint processing.

(3) The response time required for commitment can be shortened. In general, the cost for commitment in the shadow page technique depends upon the following two points: Firstly, a large amount of data corresponding to all pages including an updated page must be read from a buffer memory and written to a disk during commitment. Secondly, random writing of data to the disk occurs because of file fragmentation. On the other hand, in the shadow segment technique, the amount of write data is substantially equal to that in the shadow page technique. However, the shadow segment technique can acquire sequential writing performance close to logging by preparing a sufficiently large shadow segment area 22 with respect to the amount of updated data. This is because allocation of unused pages (new pages) used for data update in the shadow segment area 22 can be performed sequentially with the positions of the pages cyclically shifted.

(4) Data update can be performed during writing data back to the original position (i.e., during checkpoint processing). The shadow segment technique can be regarded as a combination of the shadow page technique and the side-file technique. The side-file technique is disadvantageous in that data update cannot be performed during writing data back to its original file. However, in the embodiment, this disadvantage is overcome by managing checkpoint processing as an independent transaction (internal transaction) TRc that occurs in the file management system 10. In other words, in the embodiment, transaction TRc as checkpoint processing can be subjected, as well as a common transaction, to batch processing based on group commitment, and checkpoint processing is piggybacked onto common transaction processing to be partially executed therein. Thus, the above-mentioned disadvantage is overcome.

As described above, if all pages of the shadow segment area 22 are current pages, the load of checkpoint processing (real update processing) is very high. In this case, it is advisable to perform checkpoint processing several times, while imparting an upper limit to the number of pages processed at a time. Thus, instead of performing checkpoint processing in consistent units, checkpoint processing is performed partially to reduce the load required for it.

An on-line backup operation performed in the embodiment will be described. This operation is divided into first and second on-line backup operations, which will be described in order. The first on-line backup operation means on-line backup of only data in the data segment area 21, and the second on-line backup operation means backup via on-line of data including pages of the shadow segment area 22 that have failed in real update.

Figure 12:
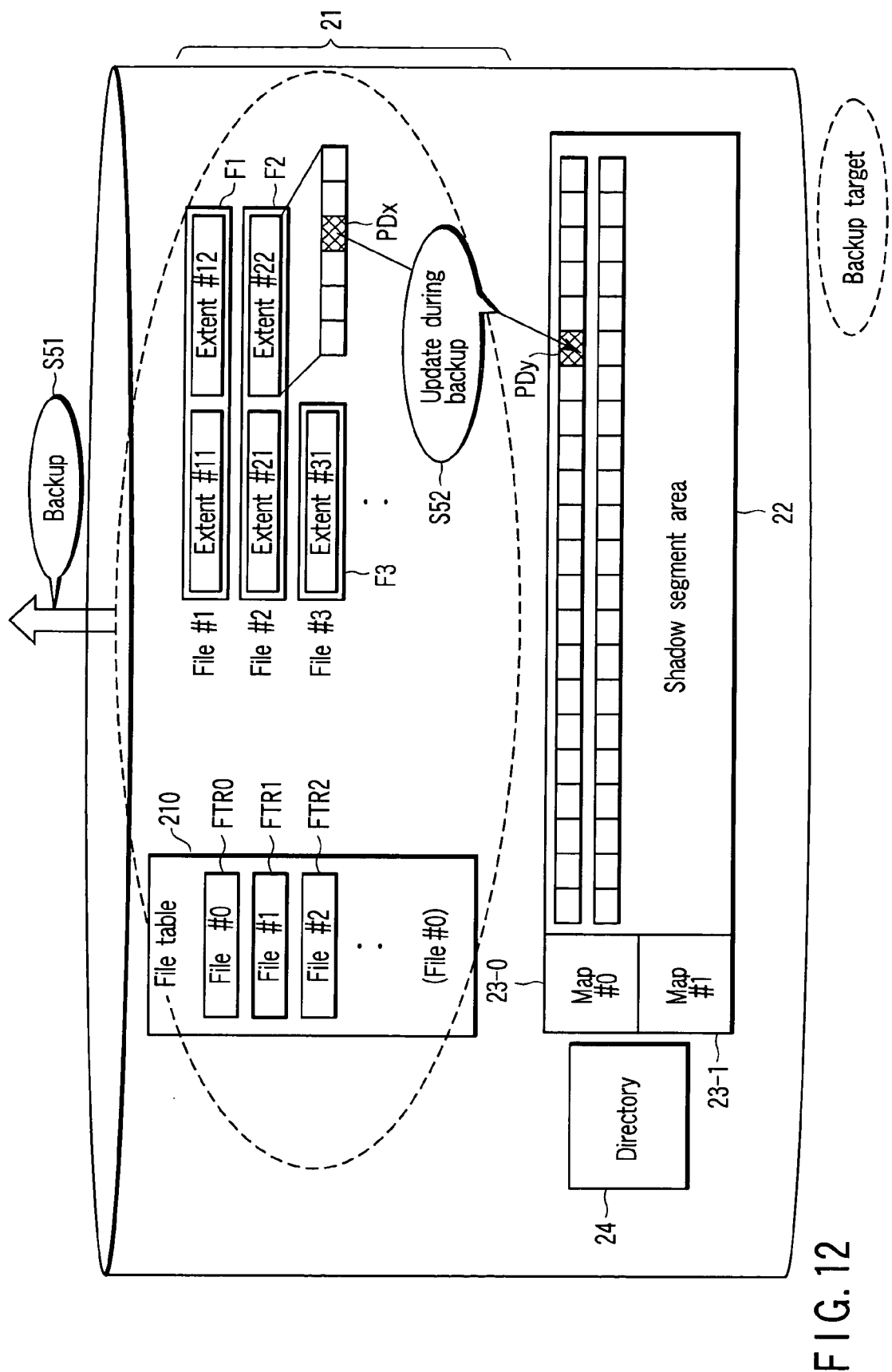
FIG. 12 is a view useful in explaining a first on-line backup process employed in the embodiment.

Referring first to FIG. 12, the first on-line backup operation will be described. In this case, when on-line backup processing is performed, checkpoint processing (read update processing) as shown in FIG. 6 is performed by the checkpoint processing unit 13. Using internal transaction TRc, checkpoint processing (read update processing) can be performed in parallel with update processing performed during a common transaction.

Assume here that data in all updated pages (current pages) in the shadow segment area 22 has been written back to the data segment area 21 (subjected to real update processing). At this time, as shown in FIG. 12, a backup unit 15 backups only data in the data segment area (original area) 21 (step S51). During the backup, assume that data update concerning the data segment area 21 has occurred. In this case, data update is performed in an unused page in the shadow segment area 22, using a copy of an image of a to-be-updated page. Assume here that data update of page PDx in file #2 (F2) in the data segment area 21 is performed, using page PSx in the shadow segment area 22 as shown in FIG. 12 (step S52). Thus, in the embodiment, updated data is written to the shadow segment area 22. Accordingly, the consistency of data in the data segment area 21 during backup is guaranteed.

Referring then to FIG. 13, the second on-line backup operation will be described. Firstly, assume that some pages in the shadow segment area 22 have failed in data write-back (real update) during checkpoint processing (real update processing) performed when on-line backup is performed. It is possible that such pages occur when internal transaction TRc as checkpoint processing is performed in parallel with a common transaction. In other words, when a transaction exists which needs the page in the data segment area 21 that is a destination, to which the data of the updated page in the shadow segment area 22 is to be written back, write-back (real update) of the data of the updated page is impossible.

In the example of FIG. 13, four pages PS1, PS8, PSt and PSu are shown as the pages in the shadow segment area 22 that have failed in real update. When the shadow segment area 22 contains pages that have failed in real update (i.e., contains effective pages that have not yet been written back), the backup unit 15 performs the following backup operation. In addition to the backup of data in the data segment area (original area) 21, the backup unit 15 backs up the current pages in the shadow segment area 22 that have failed in real update. In the example of FIG. 13, pages PS1, PS8, PSt and PSu are backed up. The backup unit 15 also backs up the original one (i.e., the map fixed by the latest commitment) of the maps 23-0 and 23-1. In the example of FIG. 13, since the map 23-0 is the original one, it is backed up. As is apparent, the map 23-0 stores only records including the physical IDs of pages PS1, PS8, PSt and PSu. These records also include the physical IDs of the original pages in the data segment area 21, to which images of pages PS1, PS8, PSt and PSu are to be written back.

Assume that during the backup process, a request to update data in the data segment area 21 has occurred. In this case, data update in the shadow segment area 22 is performed by copying an image of a to-be-updated page to a new page in the shadow segment area 22 and updating the image in the new page. Accordingly, the consistency of data realized by the combination of the data segment area 21 and the page in the shadow segment area 22 that has failed in real update is guaranteed. Namely, in the embodiment, data update is possible during backup processing. In other words, consistent backup is realized during data update processing.

As described above, when the shadow segment area 22 contains a page that has failed in real update, this page and the original map are backed up, as well as the backup of the data segment area 21. This being so, even if a failure has occurred in, for example, the storage unit 20, real update of a page that has failed in real update can be realized after the state of data is restored to the original state based on backup data. At this time, a record corresponding to the page that has failed in real update is stored in the original map. In accordance with the record, the image of the page is correctly written back to the original position in the data segment area 21. Further, if there is an updated page that has failed in real update (in write back) by checkpoint processing performed for on-line backup, it is advisable to store, in the local memory 40, information concerning the updated page (current page) and corresponding original page, and to back up the information. In this case, from the stored information, the current page and the original page can be uniquely specified. This enables real update to be promptly executed without searching the original map.

[Modification]

As described previously, the above embodiment is characterized by the shadow segment technique based on the shadow page technique. More specifically, the embodiment is characterized in that data update is performed on a current page in the shadow segment area 22, and not on the original page in the data segment area 21 corresponding to the current page. By virtue of this structure, the data segment area can be referred to, with the state before data update maintained, even during execution of a transaction. In the embodiment, however, transaction processing features are realized by atomically switching the pair of maps 23-0 and 23-1. Therefore, if a transaction referring to an original page exists, the next transaction cannot be started. This problem will now be described.

Assume here that update transaction TR1 is started using the map 23-0 (#0) as the original one and the map 23-1 (#1) as the current one. Further, assume that reference transaction TR2 refers to the original map #0 to perform consistent inquiry, and that thereafter, update transaction TR1 is completed. Further, in this state, assume that update transaction TR3 is tried to be started using the map #1 as the original one, and the map #0 as the current one. However, at this time, since reference transaction TR2 is referring to the map #0, update transaction TR3 cannot be started. The same problem occurs in the conventional shadow page technique in which transaction processing features are realized by atomically switching a pair of page tables.

Multi-version concurrency control (MVCC) is known as means for solving this type of problem.

The multi-version concurrency control function is characterized in the following four points:

(a) "Lock" is not acquired in search (reference) processing;

(b) When a search (reference) request is issued, "standby state" does not occur even during data update by another transaction;

(c) When a search (reference) request is issued during data update by another transaction, what can be acquired is the data image committed before search is started; and (d) This old-version data image is held until a result set acquired from search is closed, i.e., until part of data as the result set becomes unnecessary to be held.

On the other hand, in logging, transaction processing features is realized by a technique for holding a number of old versions of before images. However, in this technique, both after images and before images must be held as well as the original area, which occupies a large area on a disk and inevitably costs high.

A modification of the embodiment is characterized in that multi-version concurrency control is made to be applicable to the shadow segment technique. To this end, the modification employs two concepts, i.e., (1) commit time and (2) MVCC queue. These two concepts will be described.

(1) Commit Time

To realize transaction separation level READ_COMMITTED (by MVCC) corresponding to the above feature (c), a data image already committed is needed "when search is performed". The time "when search is performed" means the time when the commitment is completed immediately before search. "Commit time" is a concept for specifying the time "when search is performed". In the modification, the number of commitments performed after the system is activated for the first time is used as the commit time. Namely, the commit time increases monotonously.

(2) MVCC Queue

In the simple shadow page technique, an original page before update may be canceled when a commitment is completed. In the modification, however, to enable past versions of page images to be referred to, a page referred to by any other transaction is not canceled (not reused). To this end, information used as a criterion for determining whether another transaction refers to a page is necessary. This information is a local map of a different generation corresponding to the map 23-$i$ ($i$=1, 2), and an MVCC queue is used to store such local maps. Since it is not necessary to permanently hold the MVCC queue, this queue can be established in the local memory 40.

FIG. 14 is an example of an MVCC queue 41 held in the local memory 40. As shown, the MVCC queue stores a plurality of generations of local maps 410-1, 410-2, .... Each local map 410-$j$ ($j$=1, 2, ...) is additionally provided with information indicating commit time Tj as a time stamp. Commit time Tj indicates the commit time of transaction TRj, i.e., the number of commitments that occur until transaction TRj is committed after the system is activated for the first time. In this modification, T1<T2.

Thus, the file management system 10 of the modification employs, as well as the maps 23-0 and 23-1, dynamic maps (local maps) 410-$j$ of different generations stored in the MVCC queue 41 and used by transactions during execution. In the modification, any original page referred to by these maps is not reused. This structure has the following advantages, compared to the above-described transaction processing features realized by the log and before images:

(1) Since the transaction processing features are realized only by after images, the number of data copy processes required is small;

(2) Since no before-image area is necessary, the required disk area is small; and (3) The reference to the maps for realizing the transaction processing features is substantially the same process as that for MVCC, therefore it does not cost high to realize the modification.

Referring back to FIG. 5, a description will be given of the operation of the modification, using, as an example, the case of updating data in a page. As described previously, in the example of FIG. 5, the data to be updated by transaction TR is file #2 (F2), that the page to be updated is the second page PD1 of extent #22. For facilitating the description, assume that transaction TR is transaction TRj. The physical ID of page PD1 is 1000. In the shadow segment technique, update of page PD1 is performed by copying an image of page PD1 to an unused page (new page) in the shadow segment area 22, and updating the image in the new page. In the example of FIG. 5, the unused page is page PS1 with physical ID=SS1.

In this case, in a commit process for transaction TRj, the commit module 113 of the update processing unit 11 copies, to the map 23-1, the data of the map 23-0 considered to be the original one at the start of transaction TR. Subsequently, a record including physical ID=1000 and physical ID=SS1 is added to the resultant map 23-1. Further, the original map is switched from the map 23-0 (#0) to the map 23-1 (#1). In the modification, the commit module 113 generates a copy of the map (map 23-1) to be changed as the original map when a commitment is performed, and stores (adds) it as the latest local map 410-$j$ in the MVCC queue 41. Commit time Tj when the commitment is performed is attached as a time stamp to transaction TRj.

Referring to FIGS. 7 and 8, a description will be given of data read processing (reference processing) performed during data search by transaction TRk, using, as an example as in the above embodiment, the case of reading data of a page with serial number 10 from file #2 (F2). Firstly, the read module 121 of the read processing unit 12 sets, as transaction start time Tk, the commit time when transaction TRk has issued a request for data search (request for reference). Subsequently, the read module 121 reads file table record FTR2 from the file table 210. From the extent structure of file #2 indicated by file table record FTR2, the read module 121 recognizes that the page with serial number 10 is the fifth page of extent #22, i.e., the page with physical ID=215.

The read module 121 determines, from information (add request) stored in the local memory 40 in relation to transaction TRk, whether the page with physical ID=215 is the page updated by transaction TRk itself. If the page with physical ID=215 is the updated page, the current-page read module 121b of the read module 121 reads data of the updated page.

In contrast, if the page with physical ID=215 is not the updated page, the map search module 121a of the read module 121 refers to the MVCC queue 41, and searches the queue 41 for a local map that holds a commit time corresponding to transaction start time Tk. Thus, one important point of the modification lies in that the MVCC queue 41 is searched using the transaction start time as a key.

Assume here that local map 410-2 is detected from the MVCC queue 41 as a local map with a commit time corresponding to transaction start time Tk. In this case, the map search module 121a searches local map 410-2 for a record including physical ID=215. If the record including physical ID=215 is stored in the local map, the map search module 121a reads, from the record, the physical ID of the current page stored therein together with physical ID=215, and transfers it to the current-page read module 121b of the read module 121. The current-page read module 121b, in turn, reads data from the current page in the shadow segment area 22 that is indicated by the physical ID sent from the map search module 121a. Thus, in the modification, for data reading performed when transaction TRk performs data search, an updated list with a time stamp corresponding to the transaction start time Tk of transaction TRk is utilized. As a result, consistent data at the start time of transaction TRk can be acquired during data update. In other words, consistency of data can be guaranteed without suspending reading of data during data update.

On the other hand, if local map 410-2 does not store the record including physical ID=215, the map search module 121a searches the original map 23-0 for the record including physical ID=215. If the original map 23-0 stores the record including physical ID=215, the map search module 121a reads, from the record, the physical ID of the current page stored therein together with physical ID=215, and transfers it to the current-page read module 121b of the read module 121. The current-page read module 121b, in turn, reads data from the current page in the shadow segment area 22 that is indicated by the physical ID sent from the map search module 121a. If, on the other hand, the record including physical ID=215 is not stored even in the original map 23-0, the current-page read module 121b directly reads data from the page with physical ID=215.

The process for releasing a local map from the MVCC queue 41 will be described. This process (map releasing process) is also called a checkpoint process, like the real update process employed in the embodiment. Local map releasing is periodically performed by, for example, the map release module 133 of the checkpoint processing unit 13. The map release module 133 firstly acquires the oldest start time (oldest transaction start time) T from the start times of currently executed transactions (transaction start times). Subsequently, the map release module 133 compares the transaction start time T with the times stamps, i.e., commit times T1, T2, . . . , of local maps 410-1, 410-2, . . . stored in the MVCC queue 41, thereby releasing, from the MVCC queue 41, all local maps having older stamps (earlier commit times) than the transaction start time T.

In accordance with the release of local maps, it becomes necessary to manage unused pages in the shadow segment area 22 and to compress the original map. This process is executed as an internal transaction in the file management system 10. When update is performed frequently, the load required for update can be reduced by performing batch processing that uses group commitment.

When the MVCC function is realized by the above-described shadow segment technique, real update is also influenced by the function. Real update can be performed only on the pages that are not referred to by the local maps stored in the MVCC queue 41. In other words, the pages indicated by the local maps stored in the MVCC queue 41 may well be referred to by a currently executed transaction, therefore are excluded from reuse.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A file system with a transaction management function comprising:
    a storage unit including a storage area in which a file area and a temporary write area are allocated, the file area storing files each having pages, the temporary write area being used to temporarily store update data in units of pages of the files;
    a pair of map tables used to record a list of updated effective pages included in the pages of the files, the updated effective pages being stored in the temporary write area, the pair of map tables being allocated in the storage area;
    file management means for managing the files stored in the file area;
    update processing means for updating a page included in the files managed by the file management means, the update processing means updating the page by writing updated data to an unused page acquired from the temporary write area;
    commit means for alternately writing, to the pair of map tables, a list of the updated effective pages stored in the temporary write area whenever each of transactions is committed; and
    real update means for writing back, to an original page position in the file area, updated data of each of the updated effective pages, the real update means releasing said each updated effective page having the updated data thereof written back to the original page position.

2. The file system according to claim 1, wherein:
    the files stored in the file area are managed in units of extents;
    the file area stores a file table used to manage the files stored in the file area, the file table being a file included in the files, the file table storing, as one record, extent information indicating at least one extent included in each of the files stored in the file area; and
    the file management means manages the file table as the one file.

3. The file system according to claim 2, wherein when the page update indicates addition of data to an unused page included in an extent managed by the file table, the update processing means directly writes data to the unused page included in the extent.

4. The file system according to claim 1, wherein the real update means performs an operation for committing real update processing by updating one of the pair of map tables.

5. The file system according to claim 4, wherein the real update means realizes the real update processing by performing corresponding processing a plurality of times.

6. The file system according to claim 4, wherein when a request to update a single page in the file area is issued a plurality of times, and the update processing means writes updated data to an unused page acquired from the temporary write area each time the request is issued, the real update means writes back, to a corresponding original position in the file area, only latest one of the updated data items written to the pages acquired from the temporary write area.

7. The file system according to claim 4, further comprising backup means for on-line backing up data stored in the storage area of the storage unit, the backup means backing up only data in the file area when the real update means has completed write-back of the updated data items from all the updated effective pages in the temporary write area to respective original page positions in the file area.

8. The file system according to claim 4, further comprising backup means for on-line backing up data stored in the storage area of the storage unit, the backup means backing up, when the temporary write area contains at start of backup those of the effective pages, updated data of which has not yet completely been written back by the real update means, data stored in the file area, the updated data of said those effective pages, and one of the pair of map tables which is committed latest.

9. The file system according to claim 1, further comprising:
   a queue configured to store local maps with time stamps each indicating a commit time at which each of transactions is committed, the local map reflecting one of the map tables which is fixed at the commit time; and
   read means for reading data from a page included in the pages of the files and requested by an arbitrary transaction included in currently executed ones of the transactions, the read means searching the queue for a local map included in the local maps and having a time stamp corresponding to a start time of the arbitrary transaction, and reading data from the requested page in accordance with the searched local map.

10. The file system according to claim 9, wherein the read means reads data of the updated page when the requested page is updated by the arbitrary transaction, the read means reading data of an effective page in accordance with one of the pair of map tables which is currently committed, when the searched local map does not indicate existence of an effective page corresponding to the requested page.

11. The file system according to claim 9, further comprising map release means for releasing, from the queue in accordance with the time stamps, a local map included in the local maps and having an old time stamp included in the time stamps, the old time stamp being older than an oldest one of start times of currently executed ones of the transactions.

12. The file system according to claim 1, wherein the update processing means sequentially acquires unused pages for update from the temporary write area, with positions of pages cyclically shifted.

13. A file management method for use in a file system with a transaction management function comprising:
   allocating a file area and a temporary write area in a storage area of a storage unit, the file area storing files each having pages, the temporary write area being used to temporarily store update data in units of pages of the files;
   acquiring an unused page from the temporary write area when a request to update a page included in the files stored in the file area is issued:
   updating the page by writing updated data to the unused page acquired from the temporary write area;
   copying data of one of a pair of map tables to the other of the pair of map tables when a transaction is committed, the pair of map tables being used to record a list of effective pages included in the temporal write area and updated, the one of the pair of map tables being used to record the list when a previous transaction is committed, the other map table being not used to record the list when the previous transaction is committed;
   recording, in the one map table, a list of current effective pages in the temporary write area; and
   performing real update processing for writing back, to original page positions in the file area, the updated data of the effective pages in the temporary write area, the real update processing including release of the effective pages after the updated data of the effective pages is written back to the original page positions.

14. The file management method according to claim 13, further comprising performing update processing on one of the pair of map tables to commit the real update processing.

15. The file management method according to claim 14, further comprising on-line backing up data stored in the storage area of the storage unit, the on-line backing up including backing up only data stored in the file area when the real update processing is executed, and write back of the updated data from all the effective pages in the temporary write area to the original page positions in the file area is completed.

16. The file management method according to claim 14, further comprising on-line backing up data stored in the storage area of the storage unit, the on-line backing up including backing up, when the temporary write area contains at start of backup those of the effective pages, updated data of which has not yet completely been written back, data stored in the file area, the updated data of said those effective pages, and one of the pair of map tables which is committed latest.

17. The file management method according to claim 13, further comprising:
   accumulating local maps with time stamps each indicating a commit time at which each of transactions is committed, the local map reflecting one of the map tables which is fixed at the commit time; and
   reading data from a page included in the pages of the files and requested by an arbitrary transaction included in currently executed ones of the transactions, the reading including searching the queue for a local map included in the local maps and having a time stamp corresponding to a start time of the arbitrary transaction, and reading data from the requested page in accordance with the searched local map, when the requested page is not updated by the arbitrary transaction.

* * * * *